United States Patent
Magee

(10) Patent No.: US 10,222,113 B1
(45) Date of Patent: Mar. 5, 2019

(54) SOLAR ADIABATIC COOLING APPARATUS

(71) Applicant: Flordia A&M University, Tallahassee, FL (US)

(72) Inventor: Charles Magee, Cairo, GA (US)

(73) Assignee: Florida A&M University, Tallahassee, FL (US)

(*) Notice: Subject to any disclaimer, the term of this patent is extended or adjusted under 35 U.S.C. 154(b) by 0 days.

(21) Appl. No.: 15/684,491

(22) Filed: Aug. 23, 2017

Related U.S. Application Data

(60) Provisional application No. 62/398,692, filed on Sep. 23, 2016, provisional application No. 62/382,323, filed on Sep. 1, 2016.

(51) Int. Cl.
| | | |
|---|---|---|
| *F25D 17/06* | (2006.01) | |
| *F25D 7/00* | (2006.01) | |
| *F25D 17/04* | (2006.01) | |
| *F24F 6/02* | (2006.01) | |
| *F24F 6/04* | (2006.01) | |

(52) U.S. Cl.
CPC ............. *F25D 7/00* (2013.01); *F25D 17/042* (2013.01); *F25D 17/06* (2013.01); *F24F 6/02* (2013.01); *F24F 6/04* (2013.01); *F24F 6/043* (2013.01); *F25D 2317/0411* (2013.01); *F25D 2400/12* (2013.01); *F25D 2400/26* (2013.01)

(58) Field of Classification Search
CPC ........ F24F 6/04; F24F 6/043; F24F 2006/008; F24F 5/0035; F25D 2317/0413
See application file for complete search history.

(56) References Cited

U.S. PATENT DOCUMENTS

| | | | | | |
|---|---|---|---|---|---|
| 2,638,644 | A | * | 5/1953 | Rauhut | F24F 6/043 261/142 |
| 5,168,722 | A | * | 12/1992 | Brock | B60H 1/3202 261/DIG. 4 |
| 2008/0022709 | A1 | * | 1/2008 | McKee | F24F 5/0035 62/314 |
| 2008/0066484 | A1 | * | 3/2008 | Blackstone | A41D 13/0053 62/421 |
| 2010/0236267 | A1 | * | 9/2010 | Korytnikov | F24F 5/0035 62/259.3 |
| 2016/0128396 | A1 | * | 5/2016 | Clemente | A41D 13/0056 62/259.3 |

FOREIGN PATENT DOCUMENTS

| | | | |
|---|---|---|---|
| CN | 104913417 | * | 9/2016 |
| JP | 2009045225 | * | 3/2009 |
| WO | WO2016190787 | * | 1/2016 |

\* cited by examiner

*Primary Examiner* — Eric Ruppert
(74) *Attorney, Agent, or Firm* — Javier M. Mixco; Nilay J. Choksi; Smith & Hopen, P.A.

(57) ABSTRACT

A solar adiabatic cooling vest. The cooling vest utilizes adiabatic evaporation to cool hot, dry air. Hot outside humid air is drawn by an exhaust fan through an air inlet over large particles of salt to lower the air humidity before passing through a wetted wick material. Heat in the air evaporates water in the wetted wick material, thus causing the air leaving the wick material to be saturated and at a lower temperature than the incoming air. The saturated air passes through a salt filter to lower the air's relative humidity. After exiting the salt filter, the cooled, drier air passes through an air filter to further lower its humidity and remove any salt particles from the air. The cooled air is then distributed through flexible outlet cooling tubes to a person's body, room, or enclosed space.

18 Claims, 3 Drawing Sheets

SOLAR ADIABATIC COOLING APPARATUS

CROSS-REFERENCE TO RELATED APPLICATIONS

This nonprovisional application claims priority to U.S. Provisional Patent Application No. 62/398,692, entitled "Solar Adiabatic Cooling Apparatus", filed Sep. 23, 2016 by the same inventor, and to U.S. Provisional Patent Application No. 62/382,323, entitled "Solar Adiabatic Cooling Apparatus", filed Sep. 1, 2016 by the same inventor, both of which are incorporated herein by reference in their entireties.

BACKGROUND OF THE INVENTION

1. Field of the Invention

This invention relates, generally, to personal cooling apparatuses. More specifically, it relates to adiabatic cooling vests.

2. Brief Description of the Prior Art

A long-standing problem is the ability to stay cool in hot weather, with a serious danger being heat strokes that can, at times, lead to fatality. It has long been scientifically proven and demonstrated that when hot, low relative humidity, outside air is drawn through a wetted material, the hot air will evaporate at least some of the water in the wetted material. The loss of heat energy to evaporate water in the wetted material causes the air leaving the material to have a lower temperature and a higher relative humidity. The leaving air temperature approaches the adiabatic wet bulb temperature of the incoming hot dry air, and relative humidity of the leaving air approaches 100% saturation. However, effective use of this well-known concept by a cooling vest to maintain a safe temperature in hot weather has not been realized by the conventional art.

Accordingly, what is needed is a portable, low cost air-cooling system. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a more effective personal cooling apparatus is now met by a new, useful, and nonobvious invention.

In an embodiment, the current invention is an adiabatic cooling apparatus. The apparatus includes an inlet channel and an outlet channel that are in communication with each other. An inlet exhaust fan is disposed within the inlet channel and draws hot outside air into the inlet channel. A wick material is disposed after the inlet channel, where the wick material is wetted or saturated with a liquid in order to cool and saturate the air passing therethrough. Air travels in a direction normal to a face of the wick material, which is positioned between the inlet and outlet channels. An outlet exhaust fan is disposed within the outlet channel and after the wick material. An outlet is positioned after the outlet exhaust fan, where the outlet has an opening in communication with the outlet exhaust fan, such that the outlet exhaust fan blows air through the opening and through the outlet to exit the adiabatic cooling apparatus. Optionally, this outlet may be a flexible, vertically-oriented tubing having an open upper end and an open lower end, where the upper and lower ends permit exit of the air from the cooling apparatus. Air follows a path of travel into the inlet channel, across the inlet exhaust fan, through the wick material, through the outlet channel, across the outlet exhaust fan, and out of the outlet into the external environment.

The cooling apparatus may further include salt particles (e.g., hot rock salt) disposed in the inlet channel and after the inlet exhaust fan. The salt particles reduce a relative humidity in the air passing therethrough. Further, the salt may be encased in solar glass to heat the salt in order to reduce air humidity and increase air temperature as air passes over the salt.

The cooling apparatus may optionally include a perforated floor as well, where the air passes through the perforations.

The cooling apparatus may further include a reservoir containing the liquid contacting the wick material, such that at least a portion of the wick material is submerged within the liquid. Further, this reservoir can be positioned in underlying relation to the wick material.

The cooling apparatus may further include a salt filter and/or an air filter. The salt filter is disposed in the outlet channel and after the wick material. It is used for reducing the relative humidity of the air exiting the wick material. The air filter would then be disposed in the outlet channel and after the salt filter. It is used for further reducing the relative humidity of the air and for reducing the salt content of the air exiting the salt filter.

In certain embodiments, the apparatus further includes a photovoltaic solar array in electrical communication with the inlet exhaust fan and the outlet exhaust fan, where it generates energy for powering the cooling apparatus. This solar array may be detachable, such that the apparatus can operate without the solar array as well.

Optionally, the wick material can remain saturated during use via a frozen liquid storage chamber surrounded by an insulated sleeve and a condensation chamber surrounded by a non-insulated sleeve, which may include apertures therein for transfer of warm moist air. The chambers are coupled to each other, with the condensation chamber disposed in underlying relation to the frozen liquid storage chamber. Additional wick material may be disposed between the chambers and also coupled in underlying relation to the condensation chamber, extending downwardly therefrom.

In situations where the cooling apparatus is used as a cooling vest, it further includes a shoulder harness and a belt for securing the apparatus to the user.

In a separate embodiment, the current invention is an adiabatic cooling apparatus, including any one or more—or even all—of the foregoing features, functions, and characteristics. For example, including many of the foregoing structural characteristics, air follows a path of travel into the inlet channel, across the inlet exhaust fan, through the hot rock salt particles, through the wick material, through the outlet channel, through the salt filter, through the air filter, across the outlet exhaust fan, through the outlet tubing, and out of the outlet tubing into the external environment.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

Figure 1:
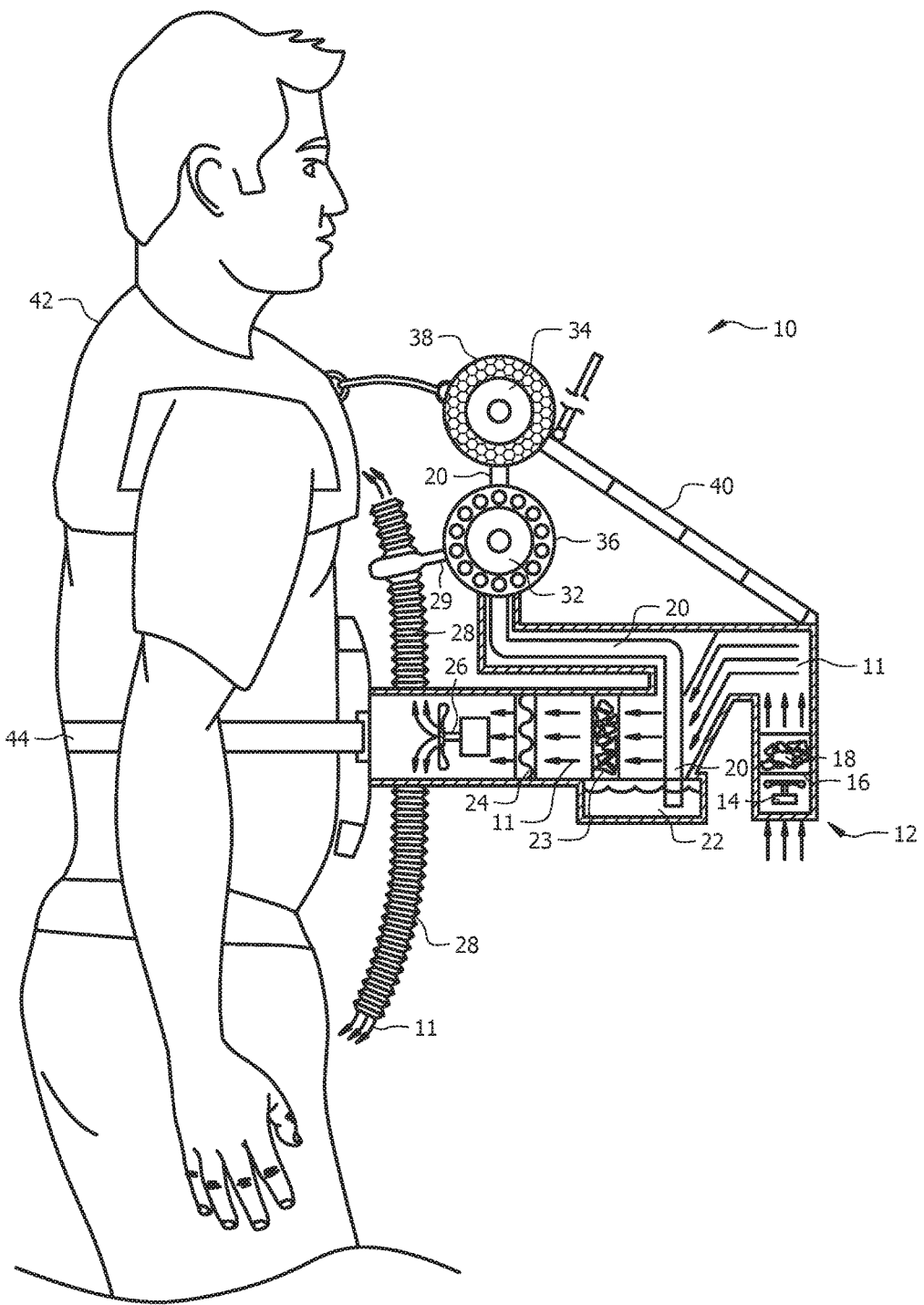
FIG. 1 is a schematic of a solar adiabatic cooling vest, according to an embodiment of the current invention.
Figure 2:
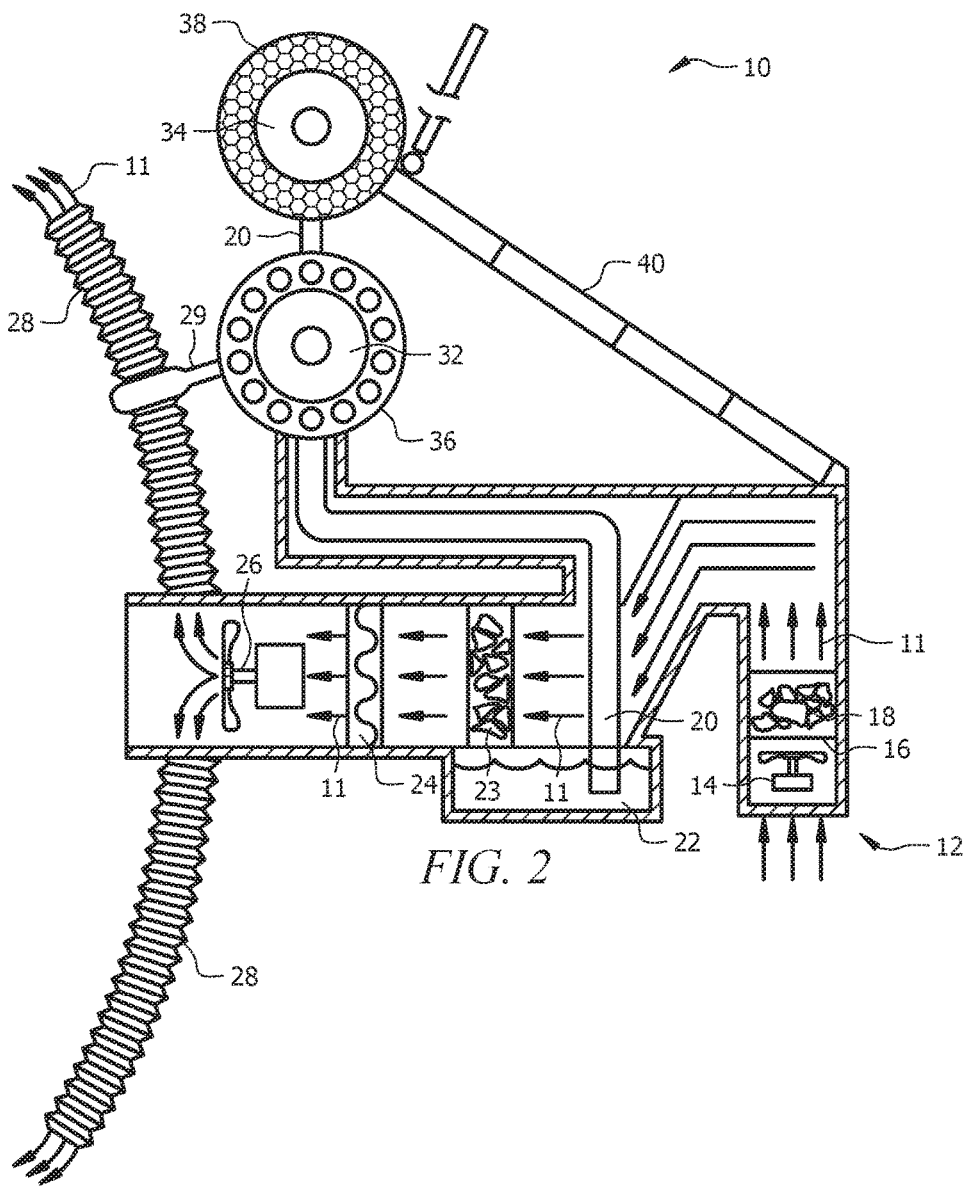
FIG. 2 is a cross-sectional view of an adiabatic cooling apparatus, according to an embodiment of the current invention.

In an embodiment, depicted in FIGS. 1-2, the current invention is a solar adiabatic cooling apparatus, generally denoted by the reference numeral 10. Apparatus 10 can be worn as a vest on the front of a user thereof, as in FIG. 1, or can be placed in a remote outdoor area, as in FIG. 2. Cooling apparatus 10 utilizes the principle of adiabatic evaporation to cool hot, dry air.

Apparatus 10 includes air inlet 12, through which hot outside humid air is drawn into apparatus 10 via exhaust fan 14 and perforated floor 16. Upon entering apparatus 10 through air inlet 12, the air passes over large particles of hot rock salt 18 in order to decrease the relative humidity of the air. Large salt particles 18 in air inlet 12 may be encased in solar glass, which can heat salt particles 18 to further lower the relative humidity of the incoming air and to increase the temperature of the incoming air as it passes over salt particles 18.

The lower-humidity air continues along its path of travel through wick material 20. Wick material 20 is wetted from being partially submerged in water or other liquid in reservoir 22. A bottom portion of wick material 20 contacting water or other liquid allows the liquid to traverse up and throughout wick material 20 to saturate wick material 20. Heat in the air evaporates water in wetted wick material 20, thus causing the air leaving wick material 20 to be saturated and at a lower temperature than the incoming air. In other words, the hot air passes through liquid-saturated wick material 20 to cool down/lower the temperature of the air. This cooled air, however, exits wick material 20 having a high humidity content.

Upon passing through/along wetted wick material 20, the saturated air passes through salt filter 23 to remove or otherwise reduce the relative humidity in the air. After exiting salt filter 23, the cooled, drier air can pass through air filter 24 to further reduce humidity and also remove or otherwise reduce any salt content/particles in the air. Upon passing through air filter 24, outlet exhaust fan 26 can continue forcing the filtered, dried, cooled air in the intended direction.

It can be understood that when two fans, such as used herein, are connected in series, the same flow must pass through each fan, and each fan will add the same total pressure as if the fan were operating independently at the same flow rate. In other words, at any given flow rate the total pressure developed by two (assumedly identical) fans in series is twice the total pressure developed by a single fan. Higher pressure will cause the exiting air stream to project farther, which is an advantageous function of the current invention.

Using exhaust fan 26, the filtered, dried, cooled air is distributed through one or more flexible outlet tubings 28 to a person's body, room, or enclosed space. Tubing 28 can be vertically-oriented, as seen in the figures, and its ends can be open so as to permit the air to blow onto the top and bottom of a user's body (if used as a cooling vest) or blow into the area being cooled. Loop 29 can be used to hold tubing 28.

Figure 3:
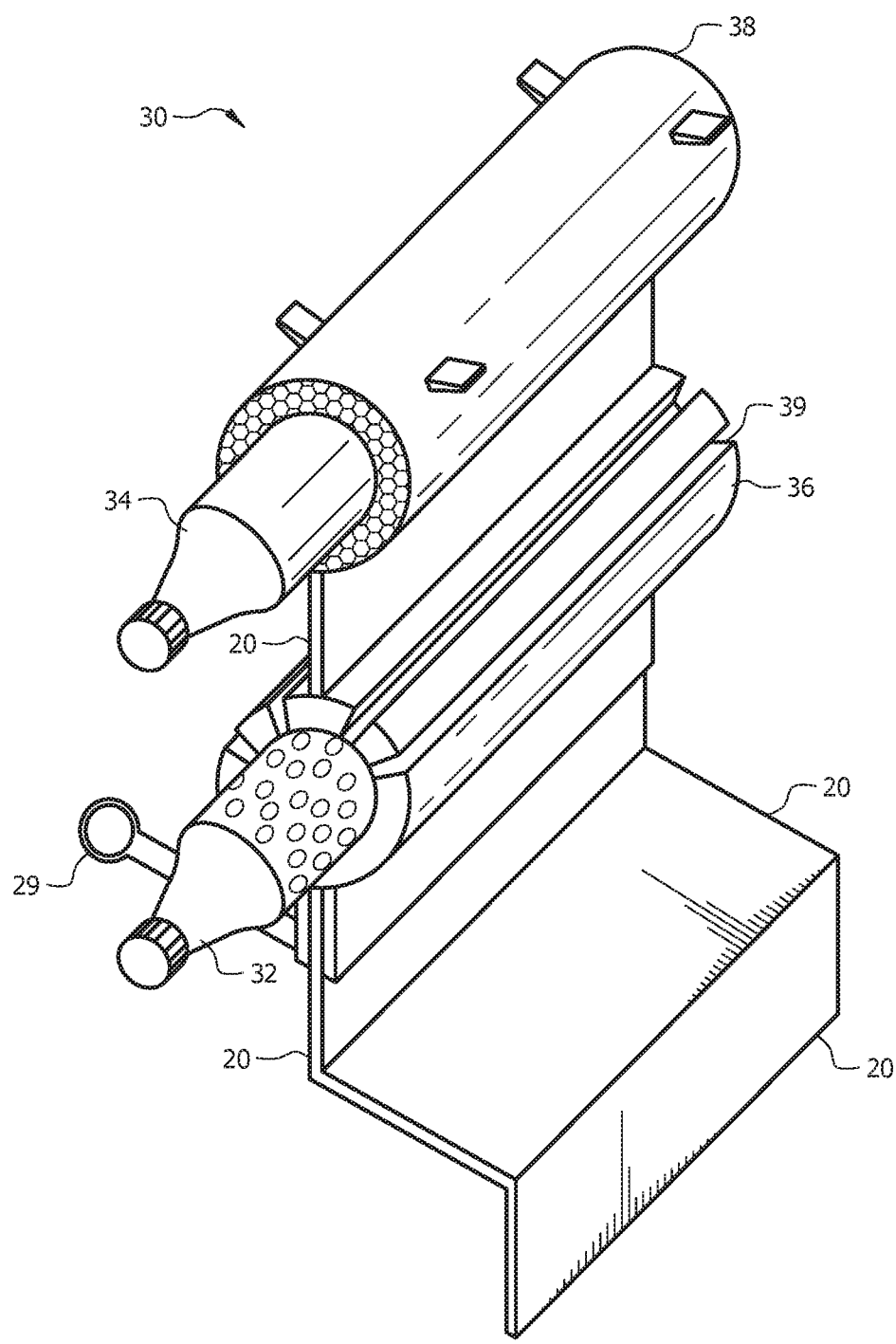
FIG. 3 is a schematic of a frozen liquid storage and condensation chamber as used in a solar adiabatic cooling vest/apparatus, according to an embodiment of the current invention.

One issue that may arise is wetted wick material 20 becoming dry and incapable of saturating and cooling the incoming air. However, the current invention contemplates a solution thereto, which is most closely seen in FIG. 3. The mechanism, generally denoted by the reference numeral 30, includes first canister of frozen water/liquid 32 and second canister of frozen water/liquid 34. Canister 32 can be enclosed or surrounded by non-insulated condensation sleeve 36, and canister 34 can be enclosed or surrounded by insulated condensation sleeve 38. Non-insulated condensation sleeve 36 may include elongate openings 39 for transfer of warm moist air. Additional wick material 20 may be disposed between first canister 32 and second canister 34 for transfer of condensate; alternatively, wick material 20 extends downwards from condensation sleeve 38. Ultimately, wetted wick material 20 can be constantly recharged with water from condensed water on the surface of a frozen bottle or can of liquid, for example as specifically discussed above.

Any known mechanism can be used to drive the functioning of the air cooling apparatus. For example, as can be seen in FIGS. 1-2, photovoltaic solar array 40 is coupled to the remainder of cooling apparatus 10 and can be in electrical communication with fans 14, 26 in order to power fans 14, 26. Solar array 40 may also be detachable and can be placed in a remote location for increased exposure to solar energy, while the remainder of cooling vest 10 is positioned in another location. For example, solar array 40 can be attached to the inside or outside of a window in a room or vehicle, while cooling apparatus 10 provides cooled air in the room or vehicle.

Optionally, if used as a cooling vest, apparatus 10 can include shoulder harness 42 and belt 44 for securing to the user. Another exemplary application of apparatus 10 is implementation into a space suit for use as a closed loop cooling system.

When used, apparatus 10 causes air to flow in the following path of travel, the direction of which is indicated by arrows 11. Air is drawn into inlet 12 via fan 14, through perforated floor 16 and salt particles 18, through wick material 20, through salt filter 23, through air filter 24, and out of tubing 28 via fan 26.

It is an object of the current invention provide a portable, air-cooling system, where it is contemplated that the system can cool hot outside air by as much as 20° F., depending on the air's relative humidity and dry bulb temperature.

Exemplary applications of the current inventions include, but are not limited to, fans at outdoor sporting events, soldiers in the field, firefighters, hikers, outside workers, sports fishermen, campers, emergency personnel during power outages, nursing homes during power outages, and residential homes or apartments in regions, states, and areas affected by planned or accidental power blackouts by utility companies. Residents in these areas, for example, can keep at least one room in a residence reasonably cool with the adiabatic cooling vest.

Glossary of Claim Terms

After: This term is used herein to refer to relative positioning of a component in the overall apparatus in view of a path of travel of the air flowing through the apparatus. For example, if an air filter is disposed/positioned "after" a salt filter, air would flow through the salt filter and then through the air filter.

Relative humidity: This term is used herein to refer to the amount of water vapor present in air expressed as a percentage of the amount needed for saturation at the same temperature.

Saturate/Saturated: These terms are used herein to refer to a relative level of moisture content, for example as a result of a particular event where an increase in moisture content is relative to level of moisture content prior to that event. Saturation can be a range of moisture content of a component. Full or 100% saturation is not necessary. For example, wick material can be damp (and not drenched) and herein still be considered saturated. As another example, air can have a relative humidity of 75% and herein still be considered saturated.

Wick material: This term is used herein to refer to any material that is capable of conveying liquid across its surface by capillary action.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An adiabatic cooling apparatus, comprising:
an inlet channel;
an inlet exhaust fan disposed within the inlet channel for drawing hot outside air into the inlet channel;
a wick material disposed after the inlet channel, wherein the wick material is wetted or saturated with a liquid in order to cool and saturate air passing therethrough, wherein air travels in a direction normal to a face of the wick material;
an outlet channel in communication with the inlet channel through the wick material, wherein the wick material is disposed between the inlet channel and the outlet channel;
an outlet exhaust fan disposed within the outlet channel and after the wick material; and
an outlet disposed after the outlet exhaust fan, the outlet having an opening in communication with the outlet exhaust fan, such that the outlet exhaust fan blows air through the opening and through the outlet to exit the adiabatic cooling apparatus,
wherein said air follows a path of travel into the inlet channel, through the inlet exhaust fan, through the wick material, through the outlet channel, through the outlet exhaust fan, and out of the outlet into an external environment, and
further comprising a plurality of salt particles disposed in the inlet channel and after the inlet exhaust fan for reducing a relative humidity in the hot outside air;
wherein the plurality of salt particles is encased in solar glass to heat the salt particles to reduce the relative humidity of the air and to increase a temperature of the air as the air passes over the salt particles.

2. An adiabatic cooling apparatus as in claim 1, wherein the plurality of salt particles includes hot rock salt.

3. An adiabatic cooling apparatus as in claim 1, further comprising a perforated floor disposed within the inlet channel.

4. An adiabatic cooling apparatus as in claim 1, further comprising a reservoir containing the liquid positioned in contact with the wick material, such that at least a portion of the wick material is submerged within the liquid.

5. An adiabatic cooling apparatus as in claim 4, wherein the reservoir is positioned under the wick material.

6. An adiabatic cooling apparatus as in claim 1, further comprising a salt filter disposed in the outlet channel and after the wick material for reducing the relative humidity of the air exiting the wick material.

7. An adiabatic cooling apparatus as in claim 6, further comprising an air filter disposed in the outlet channel and after the salt filter for reducing the relative humidity of the air exiting the salt filter and for reducing a salt content of the air exiting the salt filter.

8. An adiabatic cooling apparatus as in claim 1, further comprising an air filter disposed in the outlet channel and after the wick material for reducing the relative humidity of the air.

9. An adiabatic cooling apparatus as in claim 1, wherein the outlet is a flexible, vertically-oriented tubing having an open upper end and an open lower end, wherein the open upper end and the open lower end permit exit of the air from the adiabatic cooling apparatus.

10. An adiabatic cooling apparatus as in claim 1, further comprising a photovoltaic solar array in electrical communication with the inlet exhaust fan and the outlet exhaust fan, wherein the photovoltaic solar array generates energy for powering the adiabatic cooling apparatus.

11. An adiabatic cooling apparatus as in claim 10, wherein the photovoltaic solar array is detachable from the cooling apparatus, such that the apparatus can function without the solar array.

12. An adiabatic cooling apparatus as in claim 1, further comprising a shoulder harness and a belt disposed on the apparatus for securing the apparatus to a user thereof, wherein the adiabatic cooling apparatus operates as a cooling vest.

13. An adiabatic cooling apparatus as in claim 1, further comprising:
a frozen liquid storage chamber;
an insulated sleeve surrounding the frozen liquid storage chamber;
a condensation chamber coupled to the frozen liquid storage chamber wherein the condensation chamber is under the frozen liquid storage chamber; and
a non-insulated sleeve surrounding the condensation chamber.

14. An adiabatic cooling apparatus as in claim 13, wherein:
additional wick material is disposed between the frozen liquid storage chamber and the condensation chamber, and
the additional wick material is coupled under the condensation chamber and the additional wick material extends downwardly therefrom.

15. An adiabatic cooling apparatus as in claim 13, further comprising apertures disposed in the non-insulated sleeve for transfer of warm moist air.

16. An adiabatic cooling apparatus, comprising:
an inlet channel;
an inlet exhaust fan disposed within the inlet channel for drawing hot outside air into the inlet channel;
a plurality of hot rock salt particles disposed in the inlet channel and after the inlet exhaust fan for reducing a relative humidity in the hot outside air;
a wick material disposed in the channel and after the inlet channel, wherein the wick material is wetted or saturated with a liquid in order to cool and saturate the air passing therethrough;
a reservoir containing the liquid positioned under the wick material and in contact with the wick material, such that at least a portion of the wick material is submerged within the liquid;
an outlet channel in communication with the inlet channel through the wick material, wherein the wick material is disposed between the inlet channel and the outlet channel;
a salt filter disposed in the outlet channel and after the wick material for reducing the relative humidity of the air exiting the wick material;
an air filter disposed in the outlet channel and after the salt filter for reducing the relative humidity of the air exiting the salt filter and for reducing a salt content of the air exiting the salt filter;
an outlet exhaust fan disposed within the outlet channel and after the air filter;
a flexible, vertically-oriented outlet tubing disposed after the outlet exhaust fan, wherein the tubing has an open upper end and an open lower end, wherein the tubing has an opening in communication with the outlet exhaust fan, such that the outlet exhaust fan blows the air through the opening and through the tubing to exit the adiabatic cooling apparatus out of the open upper and lower ends; and
a photovoltaic solar array in electrical communication with the inlet exhaust fan and the outlet exhaust fan, wherein the photovoltaic solar array generates energy for powering the cooling apparatus,
wherein the air follows a path of travel into the inlet channel, across the inlet exhaust fan, through the plurality of hot rock salt particles, through the wick material, through the outlet channel, through the salt filter, through the air filter, across the outlet exhaust fan, through the outlet tubing, and out of the outlet tubing into an external environment.

17. An adiabatic cooling apparatus as in claim 16, further comprising:
a frozen liquid storage chamber;
an insulated sleeve surrounding the frozen liquid storage chamber;
a condensation chamber coupled under said frozen liquid storage chamber; and
a non-insulated sleeve surrounding the condensation chamber.

18. An adiabatic cooling apparatus as in claim 17, wherein:
additional wick material is disposed between the frozen liquid storage chamber and the condensation chamber, and
the additional wick material is coupled under the condensation chamber and the additional wick material extends downwardly therefrom.

* * * * *